(12) United States Patent
Lövsén et al.

(10) Patent No.: US 9,282,483 B2
(45) Date of Patent: Mar. 8, 2016

(54) NETWORK RESOURCE MODIFICATION

(71) Applicant: Telefonaktiebolaget L M Ericsson (publ), Stockholm (SE)

(72) Inventors: Lars Lövsén, Goteborg (SE); Sven-Ove Emanuelsson, Nol (SE); Susana Fernandez Alonso, Madrid (ES); Maria Belen Pancorbo Marcos, Madrid (ES)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 14/432,470

(22) PCT Filed: Oct. 4, 2012

(86) PCT No.: PCT/EP2012/069564
§ 371 (c)(1),
(2) Date: Mar. 30, 2015

(87) PCT Pub. No.: WO2014/053176
PCT Pub. Date: Apr. 10, 2014

(65) Prior Publication Data
US 2015/0245240 A1     Aug. 27, 2015

(51) Int. Cl.
*H04L 1/00* (2006.01)
*H04W 28/02* (2009.01)
*H04L 12/24* (2006.01)
*H04L 12/26* (2006.01)
*H04L 12/14* (2006.01)
(Continued)

(52) U.S. Cl.
CPC ....... *H04W 28/0263* (2013.01); *H04L 12/1407* (2013.01); *H04L 41/5022* (2013.01); *H04L 43/026* (2013.01); *H04L 47/20* (2013.01); *H04M 15/66* (2013.01); *H04L 47/14* (2013.01); *H04L 47/2433* (2013.01); *H04L 47/2441* (2013.01)

(58) Field of Classification Search
CPC .......... H04W 28/0263; H04L 41/5022; H04L 43/026; H04L 12/1407; H04L 47/14; H04L 47/20; H04L 47/2433; H04L 47/2441; H04M 15/66

See application file for complete search history.

(56) References Cited

U.S. PATENT DOCUMENTS 8,566,455 B1 * 10/2013 Zhao et al. .................... 709/227
8,605,655 B1 * 12/2013 Sahai et al. .................... 370/328
(Continued)

OTHER PUBLICATIONS

"3rd Generation Partnership Project; Technical Specification Group Core Network and Terminals; Policy and Charging Control (PCC); Reference points (Release 11)", 3GPP TS 29.212, V11.6.0, Sep. 2012, pp. 1-194.
(Continued)

*Primary Examiner* — Clemence Han
(74) *Attorney, Agent, or Firm* — Rothwell, Figg, Ernst & Manbeck, P.C.

(57) ABSTRACT

Traffic flow template filters with policy control and charging rule precedence are provided in a network. A request from a wireless device to add or modify at least one traffic flow template, TFT, filter, with a requested TFT filter precedence value for a particular bearer associated with the wireless device is received. A policy and charging control, PCC, rule precedence range, corresponding to the TFT filter is then determined. The determined PCC rule precedence range is transmitted to a policy and charging rules function, PCRF, block.

24 Claims, 6 Drawing Sheets

(51) Int. Cl.
    *H04M 15/00*     (2006.01)
    *H04L 12/813*     (2013.01)
    *H04L 12/801*     (2013.01)
    *H04L 12/851*     (2013.01)

(56) References Cited

U.S. PATENT DOCUMENTS

| | | | |
|---|---|---|---|
| 9,055,557 B1* | 6/2015 | Bayar et al. | |
| 2008/0019275 A1 | 1/2008 | Mudireddy et al. | |
| 2008/0232376 A1* | 9/2008 | Huang et al. | 370/395.3 |
| 2009/0252049 A1* | 10/2009 | Ludwig et al. | 370/252 |
| 2011/0065435 A1* | 3/2011 | Pancorbo Marcos et al. | 455/436 |
| 2011/0122885 A1* | 5/2011 | Hedman et al. | 370/412 |
| 2011/0238547 A1* | 9/2011 | Belling et al. | 705/34 |
| 2012/0064878 A1* | 3/2012 | Castro Castro et al. | 455/418 |
| 2012/0140665 A1* | 6/2012 | Li et al. | 370/252 |
| 2012/0147839 A1* | 6/2012 | Yin et al. | 370/329 |
| 2012/0243547 A1* | 9/2012 | Pardo-Blazquez et al. | 370/401 |
| 2013/0021905 A1* | 1/2013 | Schramm | 370/235 |
| 2013/0242918 A1* | 9/2013 | Zhou et al. | 370/329 |
| 2013/0308529 A1* | 11/2013 | Schramm et al. | 370/328 |
| 2013/0339783 A1* | 12/2013 | Fernandez Alonso et al. | 714/4.11 |
| 2014/0092739 A1* | 4/2014 | Xiong et al. | 370/235 |
| 2015/0009826 A1* | 1/2015 | Ma et al. | 370/235 |
| 2015/0106454 A1* | 4/2015 | Lim et al. | 709/206 |

OTHER PUBLICATIONS

"3rd Generation Partnership Project; Technical Specification Group Services and System Aspects; General Packet Radio Service (GPRS); Service description; Stage 2 (Release 11)", 3GPP TS 23.060 V11.3.0, Sep. 2012, pp. 1-333.

"3rd Generation Partnership Project; Technical Specification Group Services and System Aspects; Policy and Charging Control Architecture (Release 11)" 3GPP TS 23.203, V11.7.0, Sep. 2012, pp. 1-178.

"3rd Generation Partnership Project; Technical Specification Group Services and System Aspects; General Packet Radio Service (GPRS) enhancements for Evolved Universal Terrestrial Radio Access Network (E-UTRAN) Access (Release 11)", 3GPP TS 23.401, V11.3.0, Sep. 2012, pp. 1-283.

* cited by examiner

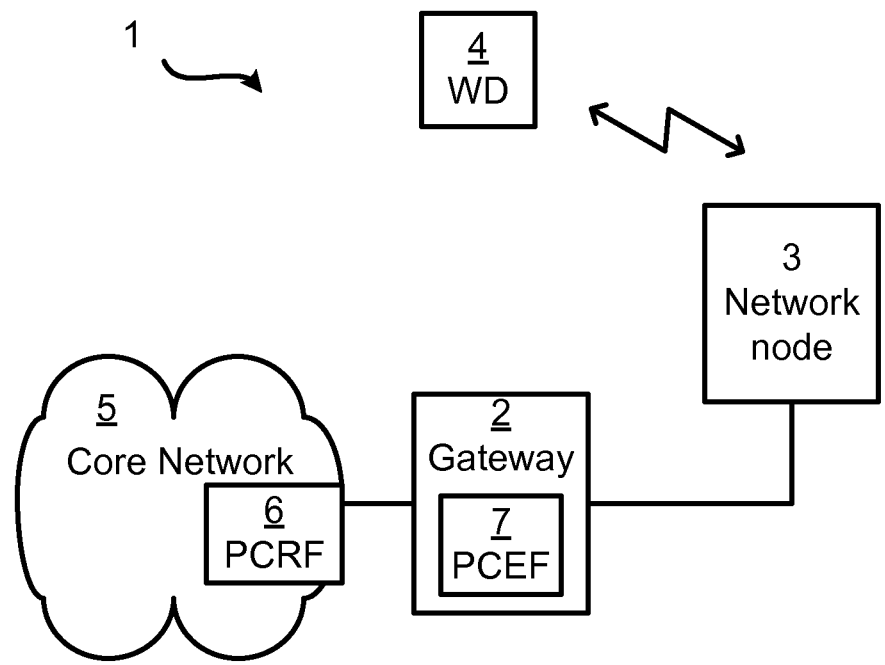
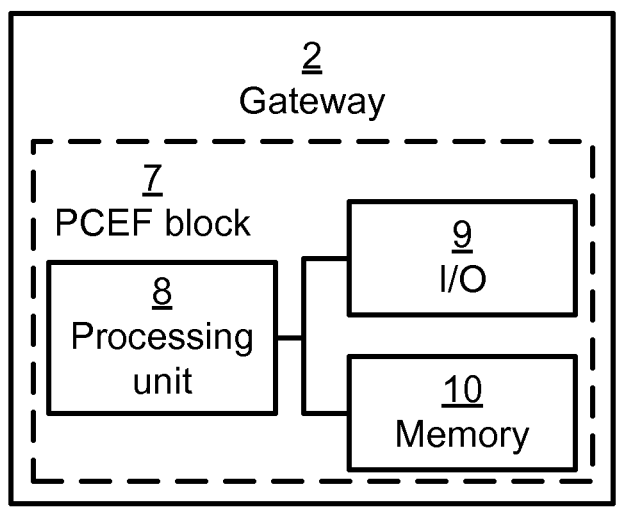
Fig. 1
Fig. 2

NETWORK RESOURCE MODIFICATION

CROSS-REFERENCE TO RELATED APPLICATION

This application is a 35 U.S.C. §371 National Phase Entry Application from PCT/EP2012/069564, filed Oct. 4, 2012, and designating the United States.

TECHNICAL FIELD

Embodiments presented herein relate to resource modifications in a network, and particularly to providing traffic flow template filters with policy and charging control rule precedence in the network.

BACKGROUND

In communication networks, there is always a challenge to obtain good performance and capacity for a given communications protocol, its parameters and the physical environment in which the communication network is deployed.

In order for a wireless device to communicate in the communication network a communications session is established between the wireless device and a network node of the communication network. The wireless device and the network node are operatively connected to a radio access network, which maintains the communication session between the wireless device and the network node. The communication session involves utilizing a data link protocol between the wireless device and the network node.

Typically the communication session is packet based. In a packet based network applications and services may be characterized by traffic classes, e.g. such as background, interactive, streaming, and conversational. Different resource allocations may be preferred for the different traffic classes. It may therefore be beneficial for a wireless device to initiate resource modifications.

However, a resource modification initiated by a wireless device may fail due to that a Policy and Charging Rules Function (PCRF) has insufficient information to assign proper Policy and Charging Control rule precedence (PCC rule precedence) to the corresponding PCC rule to be applied with respect to the resource that is to be modified due to the wireless device initiated resource modification. In general terms the resource that is to be modified is the wireless device connection to a packet data network (PDN). A resource modification may add/modify/delete capabilities of the PDN connection.

The wireless device forms its requests by manipulating Traffic Flow Template (TFT) filters. The TFT filters may e.g. be used for matching user plane packets, and Quality of service (QoS) parameters or similar, which e.g. may determine the kind of packet forwarding QoS Class Indicator (QCI) and bitrates or similar. The 3rd Generation Partnership Project (3GPP) notion of TFT filters is defined in 3GPP TS 23.060 V11.2.0, clause 15.3. For the purpose of differentiating the packet forwarding behaviour 3GPP employs the notion of bearers and QCI is used as a bearer parameter. The QCI defines the packet forwarding behaviour. All bearers, except one, must have at least one TFT filter associated.

FIG. 6 illustrates at reference numeral 30 a known set of TFTs, one of which is denoted by reference numeral 31. Each TFT is associated with a bearer. In FIG. 6 the bearer associated with TFT 31 is denoted by reference numeral 32. Each TFT is associated with one or more TFT filters. In FIG. 6 one of the TFT filters associated with TFT 31 is denoted by reference numeral 33. Each TFT filter has a precedence value. In FIG. 6 the precedence value of TFT filter 33 is 20.

FIG. 7 illustrates at reference numeral 40 a known set of PCC rules, one of which is denoted by reference numeral 41. Each PCC rule is associated with one or more service data flow (SDF) filters. In FIG. 7 the SDF filter associated with PCC rule 41 is denoted by reference numeral 42. Each PCC rule has a precedence value. The precedence value of PCC rule 41 in FIG. 7 is woo.

The binding of TFTs and PCC rules etc. may be described as follows:
- every SDF filter has a corresponding TFT filter,
- each TFT filter is associated with a bearer that offers the same QoS profile (QCI) or similar as defined for the PCC rule containing the corresponding SDF filter,
- the TFT filters are sorted in their order of precedence and the SDF filters are sorted first in their PCC rule order of precedence and second in the same order as their corresponding TFT filters yield the same sequence.

When determining what bearer is appropriate for transferring a user plane packet, a packet matching process takes the TFT filters in their order of precedence. For the first matching TFT filter, the packet is sent on the bearer associated with that TFT filter. Further, the TFT filter has a precedence value that determines in what order TFT filters are tried in the matching process.

3GPP specifies the Policy and Charging Control (PCC) rule. The PCC rule is provided from the PCRF. The PCC rule is based on TFT filter(s) requested by the wireless device to include: (a) the Service Data Flow template, which is a list of Service Data Flow (SDF) filters, (b) the PCC rule precedence, and (c) the SDF filter identity for each SDF filter. Each PCC rule includes SDF filters for user plane packet matching and has a PCC rule precedence value. The scope of the PCC rule precedence value is among the PCC rules for the wireless device's connection to the PDN. The SDF filter identity is generated for the SDF filter in response to wireless device requests only and is not generated for SDF filters generated on initiative of the network.

The network and the wireless device uses TFT filters with a precedence value as the representation for the order in which TFT filters are tried in the matching process to determine what bearer is to be used for an individual payload packet. The TFT filter precedence representation has the scope of the wireless device connection to the PDN, and is thus common for all the bearers in that connection. Each TFT filter is associated with a specific bearer.

The network entity that handles the network end of the relation to the wireless device may have PCC enabled, implementing a Policy and Charging Enforcement Function (PCEF) or Bearer Binding and Event Reporting Function (BBERF), using the PCRF for policy decisions. The PCRF enforces policy decisions at the PCEF/BBERF by using PCC/QoS rules.

However, when the wireless device requests to add a TFT filter the PCRF does not have any knowledge of what PCC rule precedence may be assigned to the PCC rule. The PCRF may even be unaware about any particular relation between the TFT filter precedence for the new TFT filter and the PCC rule precedence.

Hence, there is a need for an improved handling of additions and/or modifications to TFT filters in a network.

SUMMARY

An object of embodiments herein is to provide an improved handling of additions and/or modifications and/or deletions of TFT filters in a network, such that the binding characteristics associated with the TFT filters are maintained after addition and/or modification and/or deletion of one or more TFT filters, preferably such that:

every SDF filter has a corresponding TFT filter, each TFT filter is associated with a bearer that offers the same QoS profile (QCI) or similar as defined for the PCC rule containing the corresponding SDF filter, the TFT filters are sorted in their order of precedence and the SDF filters are sorted first in their PCC rule order of precedence and second in the same order as their corresponding TFT filters yield the same sequence.

Thus, the inventors of the enclosed embodiments have through a combination of practical experimentation and theoretical derivation discovered that in order to convey information to the PCRF so that all new and/or deleted and/or modified TFT filters are assigned PCC rule precedence that is consistent with the TFT filter precedence values, the PCEF could forward to the PCRF the possible PCC rule precedence range that may be used for the PCC rule the comprises the SDF filters that correspond to the TFT filters. A particular object is therefore to provide a PCEF centric mechanism for providing the PCRF with the possible PCC rule precedence range that may be used for the TFT filters.

According to a first aspect there is presented a method for providing traffic flow template, TFT, filters with policy and charging control rule precedence in a network. The method is performed in a policy and charging enforcement function, PCEF, block of a gateway. The method comprises receiving a request from a wireless device to add or modify at least one traffic flow template, TFT, filter, with a requested TFT filter precedence value for a particular bearer associated with the wireless device. The method comprises determining a policy and charging control, PCC, rule precedence range, corresponding to the TFT filter. The method comprises transmitting the determined PCC rule precedence range to a policy and charging rules function, PCRF, block.

Advantageously, transmitting the possible PCC rule precedence value range to the PCRF block enables the PCRF block to make policy decisions in relation to the PCC rules, which are known to the PCRF block.

Advantageously, the PCEF block restricting the PCC rule precedence assigned by the PCRF block enables the PCEF block to prevent that the PCC rule precedence value prevents successful completion of a wireless device request due to lack of free values in the value range required.

Advantageously, transmitting the PCC rule precedence range to the PCRF block as a single precedence range enables the PCRF block to assemble all of the TFT filters in a single PCC rule.

However, the possible PCC rule precedence range may also be determined for each of the TFT filters individually and provided by the PCEF block to the PCRF block together with each filter, thereby enabling the PCRF block to keep separate possible PCC rule precedence ranges. If there is no common value in the precedence ranges for all TFTs in the request this also enables the PCRF block to detect that separate PCC rules with different precedence are required.

Advantageously, transmitting the precedence order among TFT filters, enables the PCRF block to safely generate separate PCC rules for those filters if that is desirable from a policy perspective.

According to a second aspect there is presented a computer program for providing traffic flow template filters with policy and charging control rule precedence in a network, the computer program comprising computer program code which, when run on a policy and charging enforcement function, PCEF, block, causes the PCEF block to perform a method according to the first aspect.

According to a third aspect there is presented a computer program product comprising a computer program according to the second aspect and a non-volatile computer readable means on which the computer program is stored.

According to a fourth aspect there is presented a gateway for providing traffic flow template filters with policy and charging control rule precedence in a network. The gateway comprises a policy and charging enforcement function, PCEF, block. The PCEF block comprises an input/output, I/O, interface arranged to receive a request from a wireless device to add or modify at least one traffic flow template, TFT, filter, with a requested TFT filter precedence value for a particular bearer associated with the wireless device. The PCEF block comprises a processing unit arranged to determine a policy and charging control, PCC, rule precedence range, corresponding to the TFT filter. The I/O interface is further arranged to transmit the determined PCC rule precedence range to a policy and charging rules function, PCRF, block.

It is to be noted that any feature of the first, second, third and fourth aspects may be applied to any other aspect, wherever appropriate. Likewise, any advantage of the first aspect may equally apply to the second, third, and/or fourth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which:

FIG. 1 is a schematic diagram illustrating a network where embodiments presented herein may be applied;

FIG. 2 is a schematic diagram showing functional modules of a gateway;

DETAILED DESCRIPTION

Figure 3:
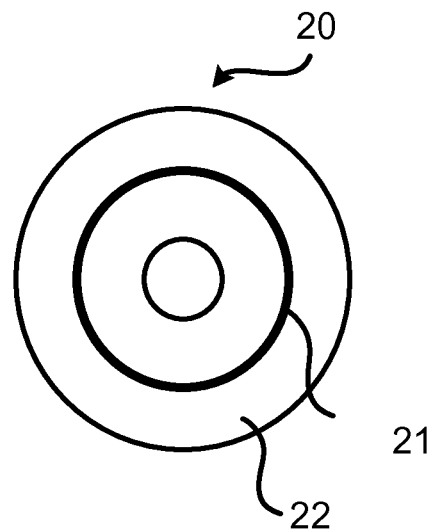
FIG. 3 shows one example of a computer program product comprising computer readable means.

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

FIG. 1 is a schematic diagram illustrating a communication network 1 where embodiments presented herein can be applied. The communication network 1 comprises a wireless device (WD) 4 operatively connected to a network node 3. The network node may thus serve as an access point for the wireless device 4 to access services provided by the core network 5. The network node 3 may e.g. be a base station, a node B, or an Evolved node B or similar. The network node 3 and the core network 5 are interconnected by a gateway (GW) 2. Some embodiments may have the gateway 2 as a part of the core network 5. The gateway 2 comprises a Policy and Charging Enforcement Function (PCEF) functional block 7 and will be further disclosed below. It is preferred that the core network 5 comprises a plurality of core network nodes, schematically illustrated by a cloud-like symbol in FIG. 1. Some embodiments have the gateway 2 as a part of the core network 5. The core network 5 further comprises a Policy and Charging Enforcement Function (PCEF) functional block 6 which will be further disclosed below.

In the communication network 1 the wireless device 4 requests resource modifications. As noted above, the wireless device 4 forms its requests by manipulating Traffic Flow Template (TFT) filters, used for matching user plane packets, and Quality of service (QoS) parameters or similar that determine the kind of packet forwarding QoS Class Indicator (QCI) and bitrates or similar.

The gateway 2 uses a TFT to discriminate between different user payloads. Particularly, the TFT filter may specify bearers to be used for individual payload packets transmitted to or from the wireless device 4. The TFT incorporates from one to eight packet filters; a unique packet filter identifier identifies each filter. Filtering can be based on one or more filter attributes. Particularly, a TFT filter as defined by 3GPP includes one or more filter parameters (from 3GPP TS 23.060) according to the following:

|  | Valid combination types | | |
| --- | --- | --- | --- |
| Packet filter attribute | I | II | III |
| Remote Address and Subnet Mask | X | X | X |
| Protocol Number (IPv4)/Next Header (IPv6) | X | X | |
| Local Address and Mask | X | X | X |
| Local Port Range | X | | |
| Remote Port Range | X | | |
| Internet Protocol Security (IPSec) Security | | X | |
| Type Of Service (IPv4)/Traffic Class (IPv6) and Flow Label (IPv6) | X | X | X |
| | | | X |

The TFT may be provided by the wireless device 4 in an activate secondary packet data protocol (PDP) context request message and stored by the gateway 2. The TFT may then be examined when routing downlink user plane data to the wireless device 4. The TFT can be modified or deleted according to a wireless device 4 initiated PDP context modification procedure. A TFT may be also assigned to a primary PDP context by means of a wireless device 4 initiated PDP context modification procedure.

Figure 6:
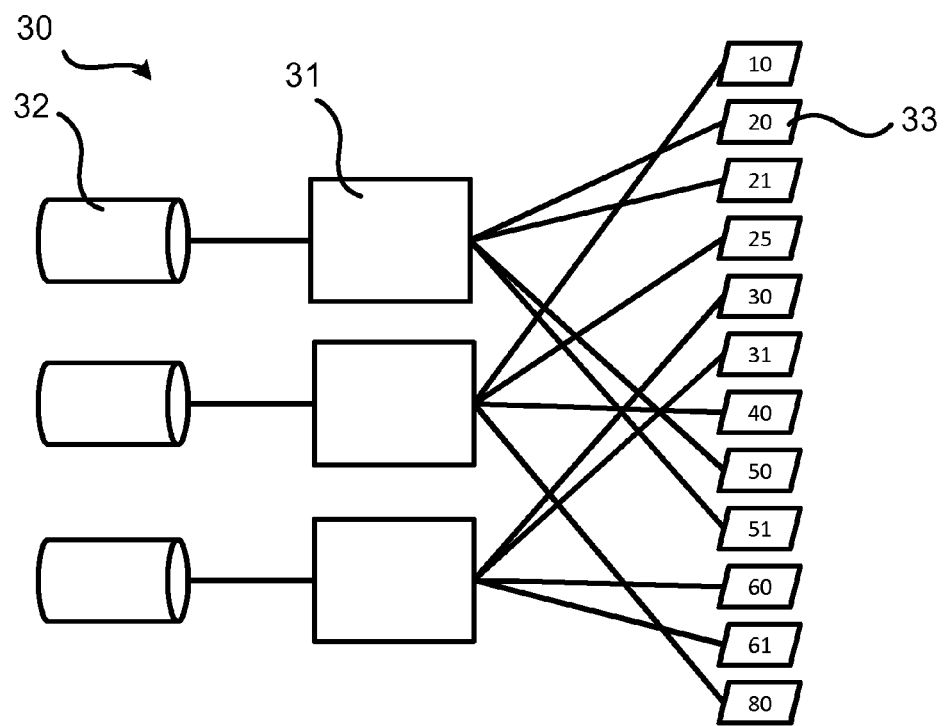
FIG. 6 schematically illustrates a set of TFT related blocks.

As noted above, a TFT is built up from packet filters (typically from 1 to 8 filters) to provide flexibility in filtering. FIG. 6 illustrates at reference numeral 30 a set of TFTs, one of which is denoted by reference numeral 31. Each TFT is associated with a bearer. In FIG. 6 the bearer associated with TFT 31 is denoted by reference numeral 32. Each TFT is associated with one or more TFT filters. In FIG. 6 one of the TFT filters associated with TFT 31 is denoted by reference numeral 33. Each TFT filter has a precedence value. The precedence value of TFT filter 33 in FIG. 6 is 20.

Figure 7:
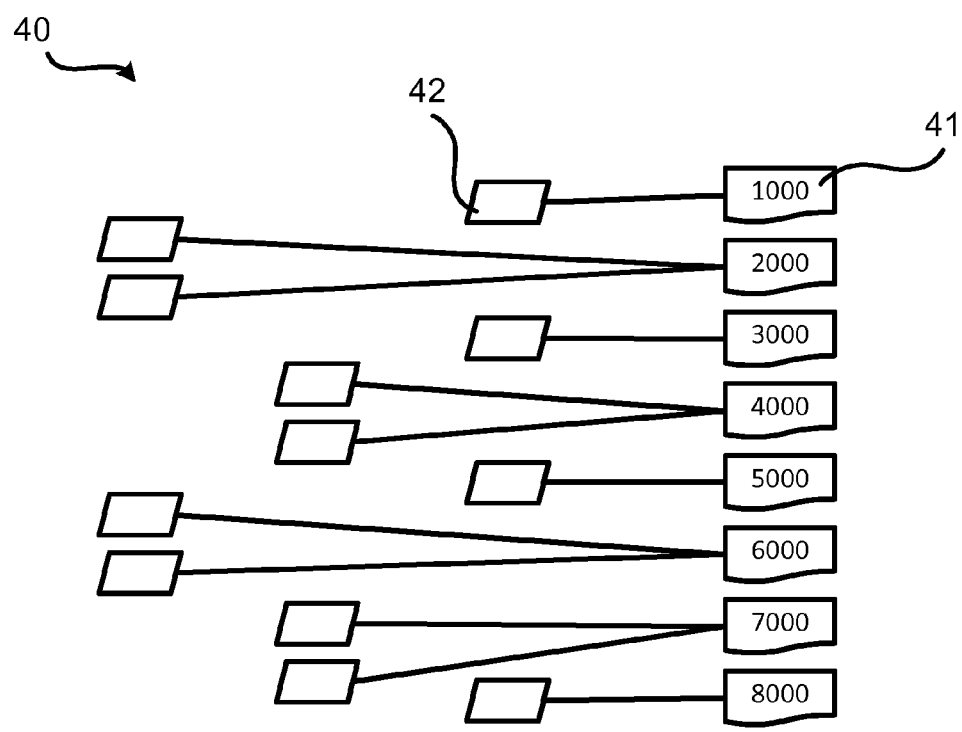
FIG. 7 schematically illustrates a set of PCC related blocks.

The policy and charging control (PCC) rule enables dynamic control of policy and charging on a per subscriber and per IP flow basis. Particularly, the PCC rules may be utilized by the PCEF block 7 and pertain to classification of traffic by a service data flow. FIG. 7 illustrates a set 40 of PCC rules, one of which is denoted by reference numeral 41. Each PCC rule is associated with one or more service data flow (SDF) filters. In FIG. 7 the SDF filter associated with PCC rule 41 is denoted by reference numeral 42. Each PCC rule has a precedence value. The precedence value of PCC rule 41 in FIG. 7 is 1000.

Figure 8:
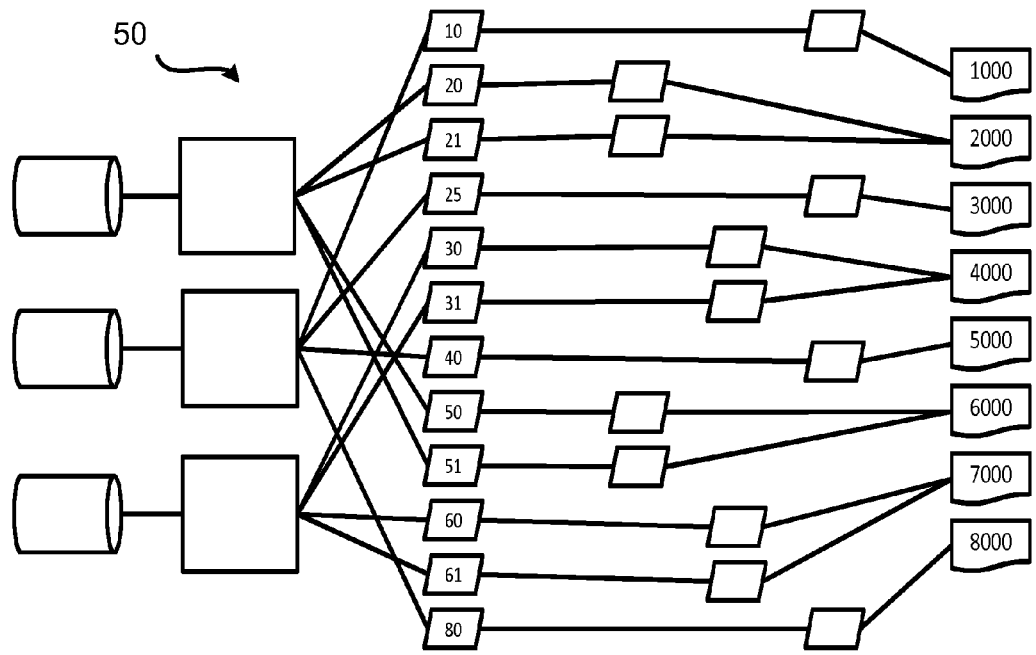
FIGS. 8-11 schematically illustrates a set of TFT related blocks associated with a set of PCC related blocks.

FIG. 8 illustrates at reference numeral 50 bearer bindings associating a set of TFT filters and a set of PCC rules.

The LTE Evolved Packet Core (EPC) comprises a PCC architecture that provides support for fine-grained QoS and enables application servers to dynamically control the QoS and charging requirements of the services they deliver. The EPC also provides improved support for roaming in comparison to legacy standards.

In general terms, a Policy Control and Charging Rules Function (PCRF) provides policy control and flow based charging control decisions. Particularly, the PCRF block 6 may be responsible of determining policy control and flow based charging control decisions in the network. The PCRF is thus a functional element that encompasses policy control decision and flow based charging control functionalities. The PCRF provides network control regarding the service data flow detection, gating, QoS and flow based charging (except credit management) towards the PCEF (see below). The PCRF may provision PCC rules to the PCEF via the Gx interface.

In general terms, the Policy and Charging Enforcement Function (PCEF) is provided in the serving gateway. Particularly, the PCEF block 7 may be responsible of enforcing gating and quality of service—e.g. such as QoS, or similar for individual internet protocol, IP—flows on the behalf of the PCRF. The PCEF may enforce gating and QoS for individual IP flows on the behalf of the PCRF. It may also provide usage measurement to support charging. The PCEF is thus the functional element that encompasses policy enforcement and flow based charging functionalities. The PCEF provides control over the user plane traffic handling at the gateway and its QoS, and provides service data flow detection and counting as well as online charging and offline charging interactions. For a service data flow that is under policy control the PCEF may allow the service data flow to pass through the gateway 2 if and only if the corresponding gate is open. Additionally, for a service data flow that is under charging control the PCEF may allow the service data flow to pass through the gateway 2 if and only if there is a corresponding active PCC rule and, for online charging, an online charging system (OCS) has authorized the applicable credit with that Charging Key. The PCEF may, for online charging, let a service data flow pass through the gateway 2 during the course of the credit re-authorization procedure. If requested by the PCRF, the PCEF reports to the PCRF when the status of the related service data flow changes. This procedure can be used to monitor an IP-CAN (IP connectivity access network) bearer dedicated for AF signalling traffic. The PCEF may select a PCC rule for each received packet by evaluating received packets against service data flow filters of PCC rules in the order of the precedence of the PCC rules. When a packet matches a service data flow filter, the packet matching process for that packet is completed, and PCC rule for that filter is to be applied.

3GPP mandates that the PCEF/BBERF maintains a situation where the PCC rule precedence values and the TFT filter precedence values are consistent. This may inter alia be accomplished by sorting the TFT filters according to their precedence (TFT filter precedence or PCC rule precedence) and ordering the TFT filters in an order so that the following holds:

a) All of the TFT filters corresponding to a particular PCC rule appear in an interval of precedence values unused by all other TFT filters b) The PCC rule precedence forms a separate system of precedence value. For any two TFT filters that correspond to different PCC rules, the TFT filter with a higher precedence corresponds to the PCC rule with the higher precedence. A PCC rule must have a unique precedence value. The PCC rule with the higher precedence must correspond to the TFT filter with the higher precedence (same sorting order)

c) The 3GPP TS 29.212 specifies (corresponding to items a and b) that PCRF provides only one precedence value per PCC rule. For network initiated IP-CAN session modification, the PCEF shall (since one PCC rule may result in more than one TFT filters) ensure that each TFT filter is assigned a unique precedence value across all TFT filters of the corresponding PDN connection (as specified in 3GPP TS 24.008). When two PCC rules result in two sets of TFT filters, the PCEF shall also ensure that the relative precedence of each set of TFT filters is same as the relative precedence of the corresponding PCC rule. Inter alia, if PCC rule R1 has higher precedence than rule PCC R2, all the TFT filters corresponding to R1 shall have higher precedence than the TFT filters corresponding to R2. The maximum value of precedence of the TFT filter is limited as specified in 3GPP TS 24.008.

The data forwarded by the PCEF to the PCRF with the Gx request comprises:

The TFT filter definition for the requested filter

The requested TFT filter precedence

The SDF filter identities for the SDF filters that are associated with the same bearer (available for filters introduced by the UE only.

Based on the above, when the wireless device requests to add a TFT filter, as illustrated in Table 1, the PCRF will not have any information regarding what PCC rule precedence may be assigned to the PCC rule.

TABLE 1

The wireless device requests to add a filter with precedence 70 on bearer 6. In prior art the numbers in italics are forwarded to the PCRF.

| Bearer | TFT filter Precedence | PCC rule precedence | SDF id |
|---|---|---|---|
| 6 | 30 | 22000 | NW init |
| 7 | 40 | 25000 | NW init |
| 6 | 50 | 30000 | *3* |
|   | *60* |   | *2* |
| 6 | *70* |   |   |
| 5 | 255+ (no TFT) | 60000+ | None |

The PCRF is thus unaware of the relation between the TFT filter precedence for the new TFT filter and the PCC rule precedence.

Conversely, when the PCRF provides PCC rule precedence for network initiated bearer establishment procedures, the gateway 2 would assign a TFT filter precedence that does not contradict the provided PCC rule precedence. However, this TFT filter precedence is unknown to the PCRF.

The PCRF is aware of the PCC rule precedence assigned to all PCC rules. However, the PCRF may know the TFT filter precedence for the TFT filters being added by a request from the wireless device.

When the wireless device 4 in such situations requests to add a TFT filter, the PCRF 6 would according to the above need to make a guess since both wireless device initiated procedures and network initiated procedures coexist. This is likely to put the new filter into the same PCC rule as the existing SDF filters. This issue is illustrated in Tables 1 and 2, where in Table 2 the PCRF cannot include the new filter in the same PCC rule as the accompanying SDF filter identities. This is because the PCC rule and TFT filter precedence shall be consistent (not contradicting) at any point in time.

TABLE 2

The wireless device requests to add a filter with precedence 20 on bearer 6. In prior art the numbers in italics are forwarded to the PCRF.

| Bearer | TFT filter Precedence | PCC rule precedence | SDF id |
|---|---|---|---|
| 6 | *20* |   |   |
| 6 | 30 | 22000 | NW init |
| 7 | 40 | 25000 | NW init |
| 6 | 50 | 30000 | *3* |
|   | *60* |   | *2* |
| 5 | 255+ (no TFT) | 60000+ | None |

In view of the Background section and in view of the above part of the Detailed Description a number of embodiments will be discussed below providing an improved handling of additions and/or modifications to TFT filters in a network.

FIG. 2 schematically illustrates, in terms of a number of functional modules, the components of gateway 2 according to embodiments of the present solution. The gateway 2 comprises a PCEF block 7. A processing unit 8 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 20 (as in FIG. 3), e.g. in the form of a memory 10. Thus the processing unit 8 is thereby arranged to execute methods as disclosed herein. The memory 10 may also comprise persistent storage, which, for example, can be any single one or combination of magnetic memory, optical memory, solid state memory or even remotely mounted memory. The gateway 2 may further comprise an input/output (I/O) interface 9 for receiving and transmitting information to other components and entities of the network 1. The processing unit 8 controls the general operation of the gateway 2, e.g. by sending control signals to the I/O interface 9 and receiving reports from the I/O interface 9. Other components, as well as the related functionality, of the gateway 2 are omitted in order not to obscure the concepts presented herein.

Figure 4:
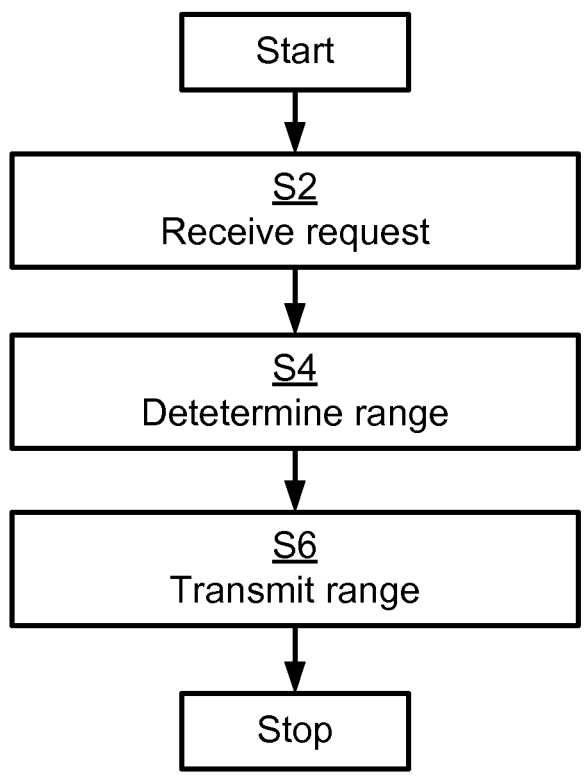
FIGS. 4 and 5 are flowcharts of methods according to embodiments.
Figure 5:
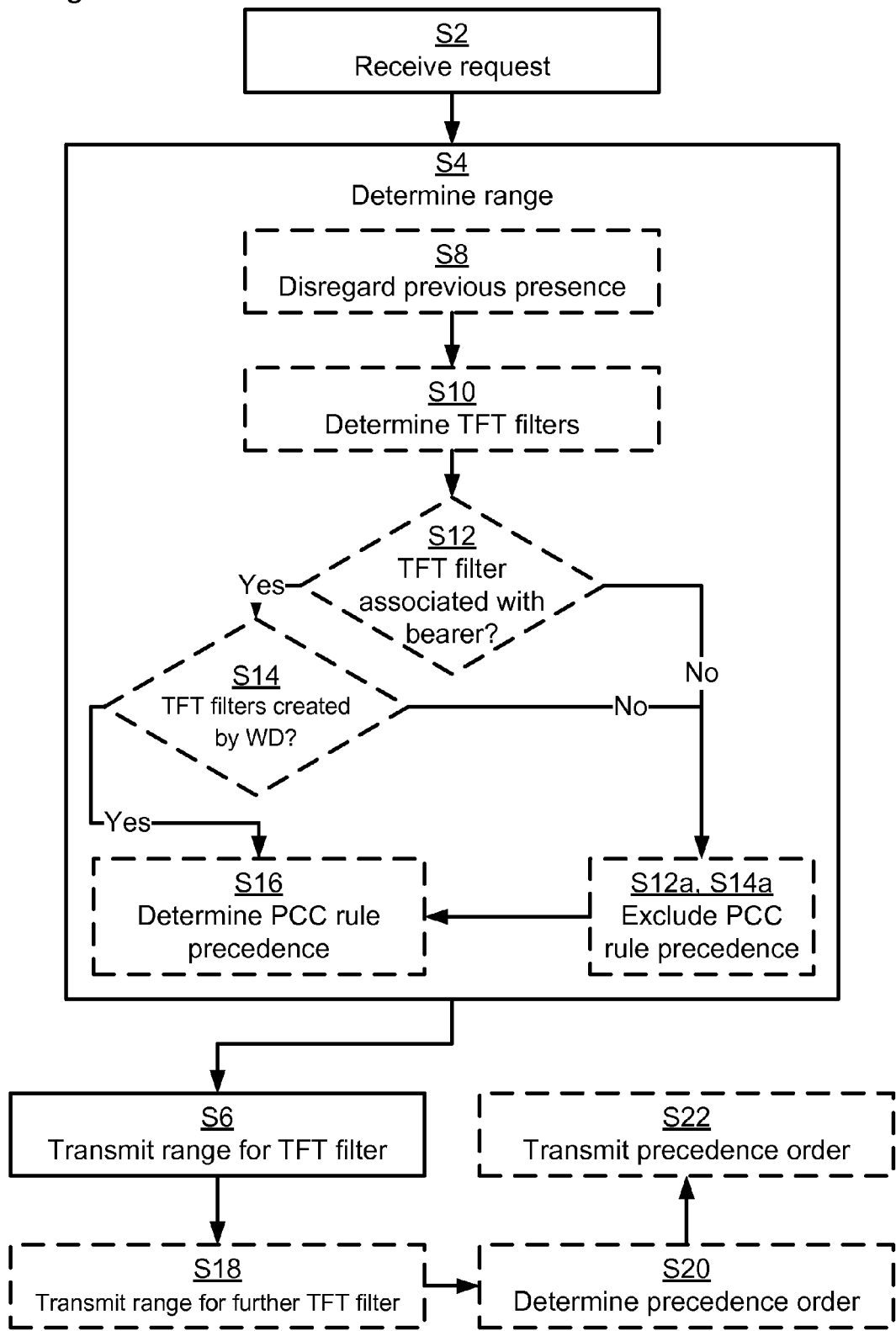

FIGS. 4 and 5 are flow charts illustrating embodiments of methods for providing TFT, filters with policy and charging control rule precedence in the network 1. The methods are performed by the PCEF block 7 in the gateway 2. The methods are advantageously provided as computer programs 21. FIG. 3 shows one example of a computer program product 20 comprising computer readable means 22. On this computer readable means 22, a computer program 21 can be stored, which computer program 21 can cause the processing unit 8 and thereto operatively coupled entities and devices, such as the memory 10 and the I/O interface 9 to execute methods according to embodiments described herein. In the example of FIG. 3, the computer program product 20 is illustrated as an optical disc, such as a CD (compact disc) or a DVD (digital versatile disc) or a Blu-Ray disc. The computer program product could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory. Thus, while the computer program 21 is here schematically shown as a track on the depicted optical disk, the computer program 21 can be stored in any way which is suitable for the computer program product 20.

Figure 9:
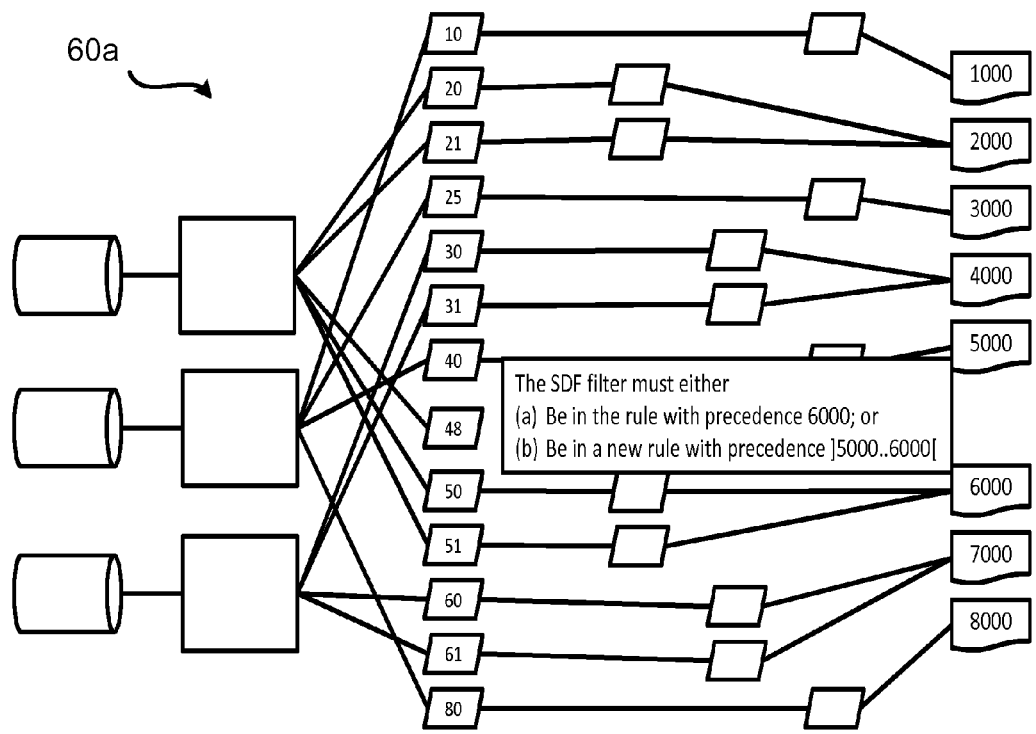

Returning now to the network 1 of FIG. 1, in a step S2 the I/O interface 9 of the PCEF block 7 of the gateway 2 receives a request from the wireless device 4 to add or modify at least one traffic flow template, TFT, filter, with a requested TFT filter precedence value for a particular bearer associated with the wireless device 4. FIG. 9 illustrates an example 60a where the wireless device 4 requests a TFT filter with precedence 48 to be added. The request transmitted from the wireless device 4 may be received by the PCEF block 7 via a BBERF. For example, the information from the wireless device 4 may arrive at the PCEF block 7 with non access stratum (NAS) signalling, e.g. as described in 3GPP TS 23.060 V11.2.0 clause 9.2.3.3 FIG. 72a, step 2, and TS 23.401 V11.2.0 clause 5.4.5 FIG. 5.4.5-1 step 3. For deployments where the PDN GW terminates the Proxy Mobile IPv6 (PMIP) protocol (c.f. 3GPP TS 23.402), the BBERF (as defined in 3GPP TS 23.203) in an S-GW/A-GW provides the TFT information to the PCRF block. In this deployment, the bearer signalling is not extended to the PDN GW, but merely terminated at the Mobility Management Entity serving gateway (MME/S-GW). Herein, the PDN GW corresponds to gateway 2 in FIG. 1.

The PCEF block 7 is arranged, upon reception of a request from the wireless device 4 to add TFT filters or modify the precedence of existing TFT filters, associated with a bearer, to translate the requested TFT filter precedence to a range of possible PCC rule precedence values. In a step S4 a policy control and charging, PCC, rule precedence range is thus determined by the processing unit 8 of the PCEF block 7. According to embodiments the PCC rule precedence range corresponds to the TFT filter and is based on, for upper and lower limits separately, the PCC rule precedence value for the PCC rule that corresponds to the neighbour TFT filter, i.e., the TFT filter having a TFT filter precedence value that is closest to the requested TFT filter precedence value.

For example, if the neighbour TFT filter is on a different bearer (but still associated with the wireless device 4), then its PCC rule precedence shall be excluded from the possible range. Further, if the neighbour TFT filter is generated by the network, then its PCC rule precedence shall be excluded from the possible range. Further, if the neighbour is generated by the wireless device 4 and is on the same bearer, then its PCC rule precedence may be included. For the case the neighbour TFT filter is on the same bearer and the TFT filter is initiated by the wireless device, the corresponding PCC rule precedence is a valid one. That is, the PCC rule precedence range may include the PCC rule precedence for a neighbour TFT filter that is initiated by the wireless device 4 on the same bearer as said particular bearer.

Hence, in light of the above examples there may be many ways to determine the PCC rule precedence range. In general terms, the range of possible PCC rule precedence values for an individual TFT filter may be delimited (i.e. the corresponding PCC rule precedence value may not be possible to use) by a number of factors. For example, the range of possible PCC rule precedence values may be delimited by:

PCC rule precedence for neighbour TFT filter on any of the other bearers; if the TFT filter with the closest higher precedence is on a different bearer than the particular bearer associated with the wireless device 4, the generated SDF filter corresponding to the new TFT filter would then, according to embodiments, be in a PCC rule with a lower precedence; reversed logic for the closest lower precedence. The PCC rule precedence range shall thus be delimited by PCC rule precedence for a neighbour TFT filter on a bearer different from the particular bearer.

PCC rule precedence for neighbour TFT filter that is network initiated; a PCC rule accommodates resources created by either the wireless device or the network, never a mix of the two; a TFT filter created by the wireless device 4 would then, according to embodiments, never be in the same rule as those created by the core network 5. Thus the corresponding SDF filter must according to such embodiments be in a rule with a different precedence. The PCC rule precedence range shall thus be delimited by PCC rule precedence for a neighbour TFT filter that is core network 5 initiated.

PCC rule precedence, reduced by one, for neighbour TFT filter with a lower precedence value and on the same bearer. The PCC rule precedence range may thus be delimited by PCC rule precedence, reduced by one, for a neighbour TFT filter with a lower precedence value and on the particular bearer.

PCC rule precedence, increased by one, for neighbour TFT filter with a higher precedence value and on the same bearer. The PCC rule precedence range may thus be delimited by PCC rule precedence, increased by one, for a neighbour TFT filter with a higher precedence value and on the particular bearer.

In case there is no neighbour TFT filter (e.g., there is not yet any TFT for the IP-CAN session), the corresponding maximum and minimum value for PCC rule precedence. The PCC rule precedence range may thus be delimited by a minimum and a maximum value of the PCC rule precedence. Such delimitation would cope with the absence of TFT filter in either direction.

Additionally, the PCC rule precedence range may includes PCC rule precedence for a neighbour TFT filter with a lower precedence value and on the particular bearer. The PCC rule precedence range may alternatively or additionally includes PCC rule precedence for a neighbour TFT filter with a higher precedence value and on the particular bearer.

An algorithm to determine the range of possible PCC rule precedence values for a single TFT filter may comprise one or more of the following actions and steps, which may be performed by the processing unit 8.

According to an embodiment, in a step S8 previous presence of any TFT filter that is subject to change of the TFT filter precedence is disregarded. In general, these TFT filters appear with a different precedence after the change. These TFT filters may therefore be removed from the baseline of TFT filters when determining the new precedence values that are possible for the corresponding PCC rule.

In a step S10 TFT filters with higher and lower TFT filter precedence that have smallest difference in precedence value compared to the requested precedence for the single TFT filter are determined. TFT filters with higher and lower TFT filter precedence that have the smallest difference in precedence value compared to the requested precedence may thereby be found for the single TFT filter. As noted above, the wireless device 4 requests a particular precedence. The notations "h" and "l" are hereinafter used to designate higher and lower, respectively.

In a step S12 it is determined for each one of the TFT filters determined in step S10, whether the each one of the TFT filters is associated with the particular bearer or not. If this is not the case a PCC rule precedence corresponding to said each one of the TFT filters is in a step S12a determined to be excluded from the determined PCC rule precedence range. Similarly, in a step S14 it is determined for each one of the TFT filters determined in step S10, whether the each one of the TFT filters is created (i.e., introduced) by the wireless device 4. If this is not the case a PCC rule precedence corresponding to said each one of the TFT filters is in a step S14a determined to be excluded from the determined PCC rule precedence range. That is, it is thereby determined, for each of the TFT filters found in step S10, whether it is associated with same bearer as the particular bearer being modified. Being on a different bearer may thus cause the corresponding PCC rule precedence to be excluded from the possible range for the possible PCC rule precedence for the single TFT filter. The notations "y" and "n" are hereinafter used to designate the same bearer (i.e. same as the particular bearer) and different bearer (i.e. different from the particular bearer), respectively.

In a step S16 PCC rule precedence for PCC rules corresponding to the TFT filters found in step S10 are determined. The PCC rule precedence for the PCC rules corresponding to the TFT filters found in step S10 is thereby found.

The possible range for PCC rule precedence value associated with the new/modified TFT filter may thereby be determined. Assuming that a high precedence has a low precedence value, the range would be:
[PCC rule hy . . . PCC rule ly] (both neighbour TFT filters on same bearer and introduced by the wireless device 4),
]PCC rule hn . . . PCC rule ly] (higher priority neighbour TFT filter on other bearer or introduced by the core network 5),
[PCC rule hy . . . PCC rule ln[(lower priority neighbour TFT filter on other bearer or introduced by the core network 5) or
]PCC rule hn . . . PCC rule ln [(both neighbour TFT filters on other bearer or introduced by the core network 1)

Figure 10:
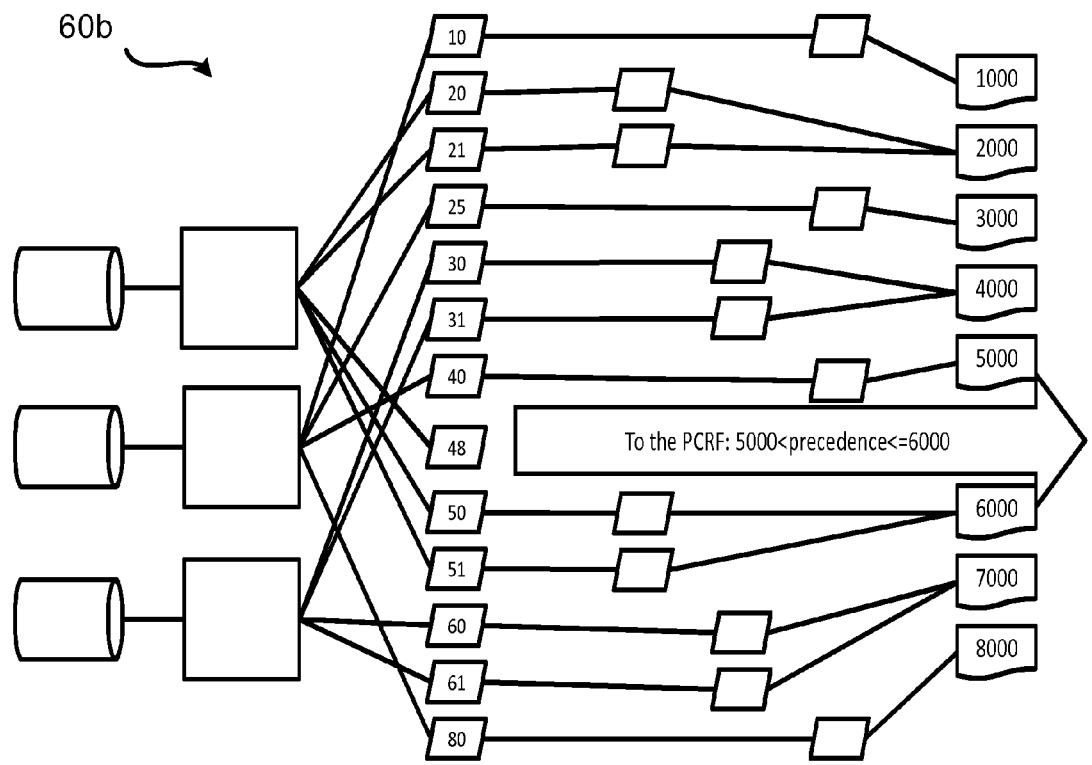

Closed brackets [low . . . high] indicate that the low/high values are included in the range, while open brackets,] low . . . high[, indicate that the low/high values are excluded from the range. So the]low . . . high[ would be equivalent to [low+1 . . . high−1]. FIG. 10 illustrates an example 60b where the wireless device 4 has requested a TFT filter with precedence 48 to be added and where the range]5000, 6000] has been determined.

Table 3 illustrates an example where the range [30000, 59999] is determined and transmitted by the gateway 2 to the PCRF block 6.

TABLE 3

The wireless device requests to add a filter with precedence 70 on bearer 6. The range of possible PCC rule precedence values are forwarded to the PCRF block 6.

| Bearer | TFT filter Precedence | PCC rule precedence | SDF id |
|---|---|---|---|
| 6 | 30 | 22000 | NW init |
| 7 | 40 | 25000 | NW init |

TABLE 3-continued

The wireless device requests to add a filter with precedence 70 on bearer 6. The range of possible PCC rule precedence values are forwarded to the PCRF block 6.

| Bearer | TFT filter Precedence | PCC rule precedence | SDF id |
|---|---|---|---|
| 6 | 50 | 30000 | 3 |
|   | 60 |   | 2 |
| 6 | 70 | [30000, 59999] |   |
| 5 | 255+ (no TFT) | 60000+ | None |

In a step S6 the determined PCC rule precedence range is transmitted by the I/O interface 9 of the PCEF block 7 of the gateway 2 to the PCRF block 6. The data that the PCEF block 7 transmits to the PCRF block 6 thus comprises information to the PCEF block 7 as to what range of PCC rule precedence values that the PCRF block 6 should select from in order for the procedure not to fail.

Figure 11:
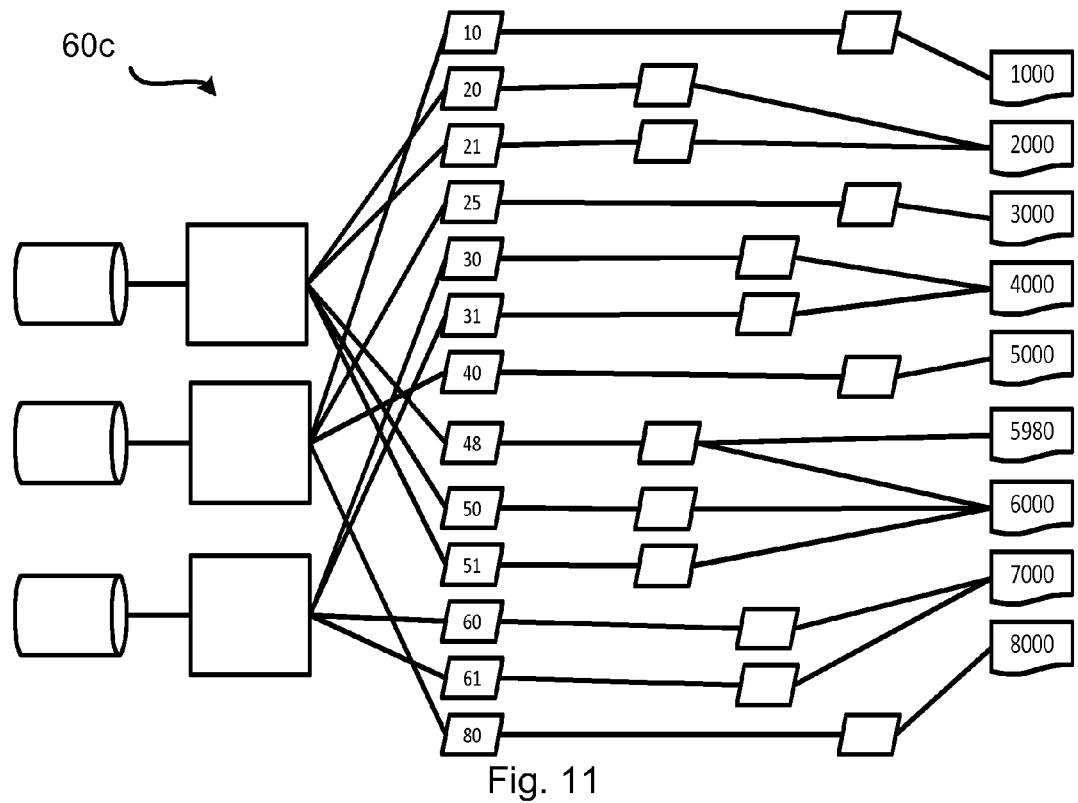

FIG. 11 illustrates an example 60c where the wireless device 4 has requested a TFT filter with precedence 48 to be added, where the range]5000, 6000] has been determined by the PCEF block 7 and transmitted to the PCRF block 6, and where the PCRF block 6 may determine a PCC precedence value of either 5980 (by creating a new PCC rule for the new TFT filter) or 6000 (by associating the new TFT filter with the existing PCC rule with precedence value 6000).

When the request pertains to modification of the PCC rule precedence of existing TFT filters, the TFT filters that are subject to change may be disregarded when determining the range of possible PCC rule precedence values in order to consider the new state desired by the wireless device 4.

In general, the request may pertain to adding and/or modifying several TFT filters. The request received in step S2 may thus further comprise a request to add or modify a further TFT filter with a further requested TFT precedence value on said particular bearer. Table 4 illustrates an example where two ranges are determined.

TABLE 4

The wireless device requests to add filters with precedence 70 and 75 on bearer 6. The range of possible PCC rule precedence values are forwarded to the PCRF block 6.

| Bearer | TFT filter Precedence | PCC rule precedence | SDF id |
|---|---|---|---|
| 6 | 30 | 22000 | NW init |
| 7 | 40 | 25000 | NW init |
| 6 | 50 | 30000 | 3 |
|   | 60 |   | 2 |
| 6 | 70 | [30000, 59999] |   |
| 6 | 75 | [30000, 59999] |   |
| 5 | 255+ (no TFT) | 60000+ | None |

In a first mode, the range of possible PCC rule precedence values for each TFT filter is determined separately and forwarded to the PCRF block 6 by the PCEF block 7, for the PCRF block 6 to use for the resulting PCC rule. In the first mode, the possible range of PCC rule precedence values are thus presented for each of the TFT filters to the PCRF block 6. Thus, in a step S18 a PCC precedence range for the further TFT filter may be transmitted to the PCRF block 6 by the I/O interface 9.

In a second mode, the range of possible PCC rule precedence values that is shared for all the requested TFT filters is forwarded to the PCRF block 6 from the PCEF block 7, for the PCRF block 6 to use for the resulting PCC rule(s). To determine the range of possible PCC rule precedence values, one alternative is to determine the common range that the TFT filters would have in the first mode. In the second mode the possible PCC precedence values are presented as one precedence range for all filters requested by the wireless device 4. The range includes all the values that are common for the individual new/modified TFT filters (i.e. the set intersection of the filters as evaluated for the elaborated mode). The transmitted PCC precedence range may thus be common for the TFT filter and the further TFT filter. The transmitted PCC precedence range may be the intersection of the individual precedence ranges for the TFT filter and the further TFT filter.

Additionally, the PCC rule precedence range may be a sub-range of an available PCC rule precedence range. That is, in order to avoid non-optimal assignment of precedence values, the PCEF block 7 may, inter alia in a Gx request, restrict the allowed range of PCC rule precedence values. Table 5 illustrates an example where the wireless device 4 requests to add a filter with precedence 20 on bearer 6. In this illustrative example values [0,9999] and [20000,25000] may be reserved for core network initiated resources and are hence excluded from the possible PCC rule precedence range.

TABLE 5

The wireless device requests to add a filter with precedence 20 on bearer 6. The range of possible PCC rule precedence values are forwarded to the PCRF block 6.

| Bearer | TFT filter Precedence | PCC rule precedence | SDF id |
|---|---|---|---|
| 6 | 20 | [10000, 19999] | |
| 6 | 30 | 22000 | NW init |
| 7 | 40 | 25000 | NW init |
| 6 | 50 | 30000 | 3 |
| | 60 | | 2 |
| 5 | 255+ (no TFT) | 60000+ | None |

As an extension of the first mode, in addition to the possible PCC rule precedence values, the precedence order of the TFT filters may be provided to the PCRF block 6 by the I/O interface 9. Particularly, in a step S20 a precedence order of the TFT filter and the further TFT filter may be determined by the processing unit 8. The precedence order of the TFT filters may be represented by the requested TFT filter precedence values or any other representation of the precedence order. In a step S22 the precedence order may be transmitted to the PCRF block 6 by the I/O interface 9. Having the request encoded so that the PCRF block 6 can decode it properly may enable the PCRF block 6 to safely create separate PCC rules, as desired, also for TFT filters that share the same range of possible PCC rule precedence values.

Upon reception of the PCC rule precedence range the PCRF block 6 may determine possible PCC rule precedence values. Particularly, the PCRF block 6 may determine possible PCC rule precedence values once (a) the PCRF block has complete knowledge on the TFT status at all times, and (b) all service data flow filters in all the PCC rules has been assigned a SDF filter identity.

Some embodiments discussed above may be summarised in the following manner:

One embodiment may be directed to a method for providing traffic flow template, TFT, filters with policy and charging control rule precedence in a network. The method is performed in a policy and charging enforcement function, PCEF, block of a gateway. The method comprises the following steps: receiving a request from a wireless device to add, delete or modify at least one traffic flow template, TFT, filter, with a requested TFT filter precedence value for a particular bearer associated with the wireless device; determining a policy and charging control, PCC, rule precedence range, corresponding to said TFT filter; and transmitting the determined PCC rule precedence range to a policy and charging rules function, PCRF, block.

The PCC rule precedence range may be determined based on PCC rule precedence value for at least one neighbouring TFT filter having a TFT precedence value that is neighbour to the requested TFT precedence value.

The PCC rule precedence range may be delimited by PCC rule precedence for a neighbour TFT filter on a bearer different from said particular bearer.

The PCC rule precedence range may be delimited by PCC rule precedence for a neighbour TFT filter that is network initiated.

The PCC rule precedence range may be delimited by PCC rule precedence, reduced by one, for a neighbour TFT filter with a lower precedence value and on said particular bearer.

The PCC rule precedence range may include PCC rule precedence for a neighbour TFT filter with a lower precedence value and on said particular bearer.

The PCC rule precedence range may be delimited by PCC rule precedence, increased by one, for a neighbour TFT filter with a higher precedence value and on said particular bearer.

The PCC rule precedence range may include a PCC rule precedence for a neighbour TFT filter with a higher precedence value and on said particular bearer The PCC rule precedence range may be delimited by a minimum and a maximum value of the PCC rule precedence.

The determining of the PCC rule precedence range may comprise the steps of disregarding previous presence of any TFT filter that is subject to change of the TFT filter precedence.

The determining of the PCC rule precedence range may comprise the steps of determining TFT filters with higher and lower TFT filter precedence that have smallest difference in precedence value compared to said requested precedence for said TFT filter.

The determining of the said PCC rule precedence range may comprise the steps of determining, for each one of the TFT filters determined in step S10, whether said each one of the TFT filters is associated with said particular bearer or not, and if not so: determining a PCC rule precedence corresponding to said each one of the TFT filters to be excluded from the determined PCC rule precedence range.

The determining of the PCC rule precedence range may comprise the steps of determining, for each one of the TFT filters determined in step S10, whether said each one of the TFT filters is created by the wireless device, and if not so: determining a PCC rule precedence corresponding to said each one of the TFT filters to be excluded from the determined PCC rule precedence range.

The determining of the PCC rule precedence range may comprise the steps of determining PCC rule precedence for PCC rules corresponding to the TFT filters found in step S10.

The request may further comprise a request to add or modify a further TFT filter with a further requested TFT precedence value on said particular bearer.

The method may further comprise the steps of transmitting a PCC precedence range for the further TFT filter to the PCRF block.

The method further comprise the actions of determining a precedence order of said TFT filter and said further TFT filter; and transmitting said precedence order to the PCRF block.

The transmitted PCC precedence range may be common for said TFT filter and said further TFT filter.

The PCC rule precedence range may be a sub-range of an available PCC rule precedence range.

The TFT filter may specify bearers to be used for individual payload packets transmitted to or from the wireless device.

The PCC rules may be used by the utilized by the PCEF block and pertain to classification of traffic by a service data flow.

The PCRF block is preferably responsible of determining policy control and flow based charging control decisions in the network.

The PCEF block is preferably responsible of enforcing gating and quality of service, QoS, for individual internet protocol, IP, flows on the behalf of the PCRF.

Some other embodiments discussed above may be summarised in the following manner:

Another embodiment may be directed to a gateway configured to operatively provide traffic flow template filters with policy and charging control rule precedence in a network, the gateway comprising a policy and charging enforcement function, PCEF, block. The PCEF, block comprises: an input/output, I/O, interface arranged to receive a request from a wireless device to add or delete or modify at least one traffic flow template, TFT, filter, with a requested TFT filter precedence value for a particular bearer associated with the wireless device; a processing unit arranged to determine a policy and charging control, PCC, rule precedence range, corresponding to said TFT filter; and wherein the I/O interface is further arranged to transmit the determined PCC rule precedence range to a policy and charging rules function, PCRF, block.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for providing traffic flow template (TFT) filters with policy and charging control rule precedence in a network, the method being performed by a gateway comprising a policy and charging enforcement function (PCEF), the method comprising:
   receiving a request transmitted by a wireless device to add or modify at least one TFT filter with a requested TFT filter precedence value for a particular bearer associated with the wireless device;
   determining a policy and charging control (PCC) rule precedence range corresponding to said TFT filter; and
   transmitting the determined PCC rule precedence range to a policy and charging rules function (PCRF).

2. The method according to claim 1, wherein said PCC rule precedence range is determined based on a PCC rule precedence value for at least one neighbouring TFT filter having a TFT filter precedence value that is neighbour to the requested TFT filter precedence value.

3. The method according to claim 1, wherein said PCC rule precedence range is delimited by PCC rule precedence for a neighbour TFT filter on a bearer different from said particular bearer.

4. The method according to claim 1, wherein said PCC rule precedence range is delimited by PCC rule precedence for a neighbour TFT filter that is network initiated.

5. The method according to claim 1, wherein said PCC rule precedence range is delimited by PCC rule precedence, reduced by one, for a neighbour TFT filter with a lower precedence value and on said particular bearer.

6. The method according to claim 1, wherein said PCC rule precedence range includes PCC rule precedence for a neighbour TFT filter with a lower precedence value and on said particular bearer.

7. The method according to claim 1, wherein said PCC rule precedence range is delimited by PCC rule precedence, increased by one, for a neighbour TFT filter with a higher precedence value and on said particular bearer.

8. The method according to claim 1, wherein said PCC rule precedence range includes PCC rule precedence for a neighbour TFT filter with a higher precedence value and on said particular bearer.

9. The method according to claim 1, wherein said PCC rule precedence range is delimited by a minimum and a maximum value of a PCC rule precedence.

10. The method according to claim 1, wherein determining said PCC rule precedence range comprises disregarding previous presence of any TFT filter that is subject to change of a TFT filter precedence.

11. The method according to claim 1, wherein determining said PCC rule precedence range comprises determining TFT filters with higher and lower TFT filter precedence that have smallest difference in precedence value compared to a requested precedence for said TFT filter.

12. The method according to claim 11, wherein determining said PCC rule precedence range comprises determining, for each one of the determined TFT filters, whether said each one of the TFT filters is associated with said particular bearer or not, and if not so: determining a PCC rule precedence corresponding to said each one of the TFT filters to be excluded from the determined PCC rule precedence range.

13. The method according to claim 11, wherein determining said PCC rule precedence range comprises determining, for each one of the determined TFT filters, whether said each one of the TFT filters is created by the wireless device, and if not so: determining a PCC rule precedence corresponding to said each one of the TFT filters to be excluded from the determined PCC rule precedence range.

14. The method according to claim 1, wherein said request further comprises a request to add or modify a further TFT filter with a further requested TFT filter precedence value on said particular bearer.

15. The method according to claim 14, further comprising transmitting a PCC precedence range for said further TFT filter to a PCRF block.

16. The method according to claim 14, further comprising:
   determining a precedence order of said TFT filter and said further TFT filter; and
   transmitting said precedence order to a PCRF block.

17. The method according to claim 14, wherein said transmitted PCC precedence range is common for said TFT filter and said further TFT filter.

18. The method according to claim 1, wherein said PCC rule precedence range is a sub-range of an available PCC rule precedence range.

19. The method according to claim 1, wherein said TFT filter specifies bearers to be used for individual payload packets transmitted to or from the wireless device.

20. The method according to claim 1, wherein PCC rules are utilized by a PCEF block and pertain to classification of traffic by a service data flow.

21. The method according to claim 1, wherein a PCRF block is responsible of determining policy control and flow based charging control decisions in the network.

22. The method according to claim 1, wherein a PCEF block is responsible of enforcing gating and quality of service, QoS, for individual internet protocol, IP, flows on the behalf of the PCRF.

23. A computer program product comprising a non-transitory computer readable medium storing a computer program for providing traffic flow template filters with policy and charging control rule precedence in a network, the computer program comprising computer program code which, when run on a policy and charging enforcement function, PCEF, block, causes the PCEF block to:

receive a request from a wireless device to add or modify at least one traffic flow template, TFT, filter, with a requested TFT filter precedence value for a particular bearer associated with the wireless device;

determine a policy and charging control, PCC, rule precedence range, corresponding to said TFT filter; and transmit the determined PCC rule precedence range to a policy and charging rules function (PCRF).

24. A gateway for providing traffic flow template filters with policy and charging control rule precedence in a network, the gateway comprising a policy and charging enforcement function (PCEF) block, the PCEF block comprising:

a receiver for receiving a request from a wireless device to add or modify at least one traffic flow template (TFT) filter, with a requested TFT filter precedence value for a particular bearer associated with the wireless device;

a transmitter; and a processing unit arranged to: i) determine a policy and charging control (PCC) rule precedence range corresponding to said TFT filter; and ii) employ the transmitter to transmit the determined PCC rule precedence range to a policy and charging rules function (PCRF).

* * * * *

UNITED STATES PATENT AND TRADEMARK OFFICE
CERTIFICATE OF CORRECTION

| | | |
|---|---|---|
| PATENT NO. | : 9,282,483 B2 | Page 1 of 1 |
| APPLICATION NO. | : 14/432470 | |
| DATED | : March 8, 2016 | |
| INVENTOR(S) | : Lövsén et al. | |

It is certified that error appears in the above-identified patent and that said Letters Patent is hereby corrected as shown below:

IN THE SPECIFICATION

In Column 2, Line 9, delete "is woo." and insert -- is 1000. --, therefor.

Signed and Sealed this
Thirty-first Day of May, 2016

Michelle K. Lee
*Director of the United States Patent and Trademark Office*